Jan. 6, 1959  A. N. A. AXLANDER  2,867,417
HEATING ELEMENT
Filed Nov. 16, 1955  2 Sheets-Sheet 1

Inventor:
Axel Nore Alexander Axlander
By: Edward P. Jurow
Atty.

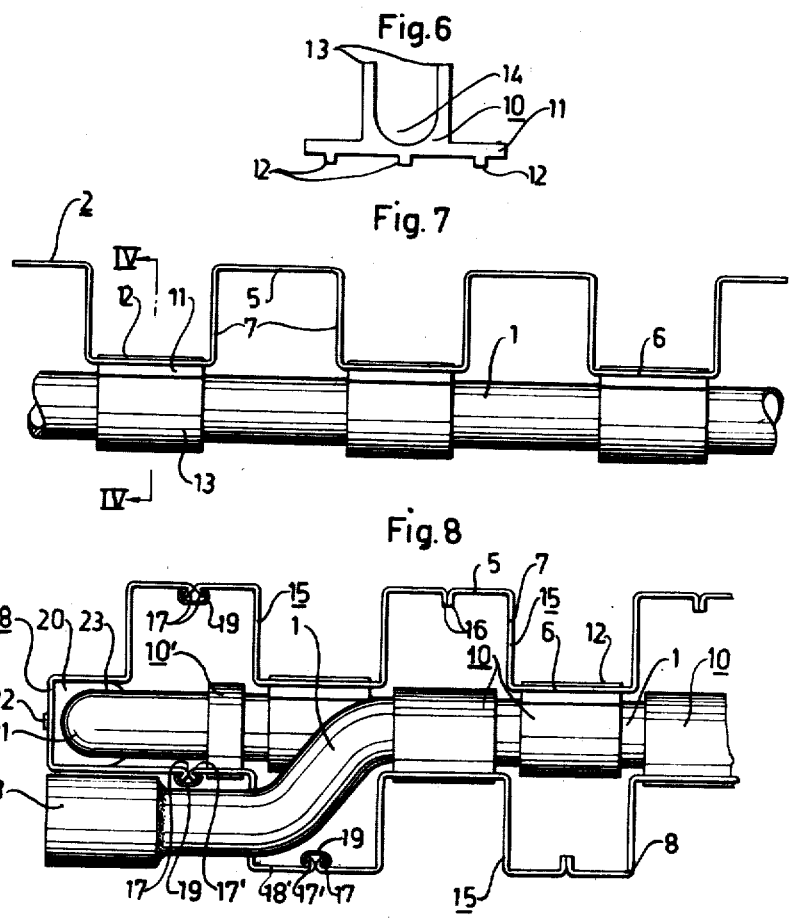

United States Patent Office 2,867,417
Patented Jan. 6, 1959

2,867,417
HEATING ELEMENT
Axel Nore Alexander Axlander, Stocksund, near Stockholm, Sweden Application November 16, 1955, Serial No. 547,215

Claims priority, application Sweden November 18, 1954

1 Claim. (Cl. 257—256)

The invention relates to a heating element of the type consisting of a pipe system for the circulation of a heating medium and one or more secondary heat emitting surfaces in heat transmitting contact with the pipe system and substantially oriented in the same plane as said system. The secondary heat emitting surfaces are in the following called "plates." The principle of such heating elements is known. They have the great advantage that contrary to heating elements of the common type, in which the members conveying the heating medium constitute the final heat emitting surfaces themselves, they permit very high pressures in the pipe system without any special reinforcement. The reason why such heating elements are not generally used, notwithstanding this and many other advantages, probably is due to the difficulties of manufacture.

These difficulties have mainly related to the connections between the pipe system and the plates, which connections must be mechanically rigid and at the same time procure a good heat conducting contact. A connection by welding can meet these requirements but is too slow a method and therefore too expensive. The combination of iron or steel for the pipe system and aluminum for the plates provides a special advantage but the welding of iron or steel to aluminum still causes technical difficulties.

The present invention solves this constructional problem enabling manufacture of heating elements of said type and at the same time meeting the requirements of rigidity and heat conductivity of the connections between the pipe system and the plates.

According to the invention the connections consist of approximately evenly spaced connecting elements of a heat conductive material having fingers embracing pipe parts of the pipe system as well as projections for engagement in corresponding openings in the plates. A rigid, heat conducting connection is procured by plastic deformation of the fingers and the projections of the connecting elements. The material for these connecting elements is preferably an extruded light metal of the type which becomes hard by mechanical working through stretching, bending, upsetting or the like.

Other features of the invention will be apparent from the following description of some embodiments of the new heating element shown on the accompanying drawings.

Figure 4 is a section along the line IV—IV in Figure 7 and Figures 3 and 5 show this detail from the right and from the left, respectively.

Figure 6 shows an end view of a connection element before the plastic deformation for the junction.

Figure 7 shows in horizontal view a detail on a larger scale of the heating element according to Figures 1 and 2.

Figure 8 shows a similar detail, relating to a heating element with a front and a back plate, composed of strips, and an example of a termination at the one end of the element.

Figure 1:
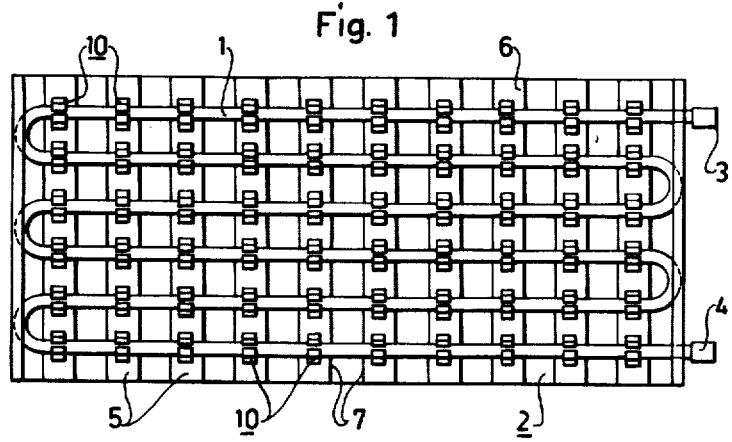
Figure 1 shows the back of a heating element, consisting of a plane pipe coil as pipe system and a corrugated plate fixed to said coil.

A heating element according to the invention comprises a pipe system 1 shown as a pipe coil, and plates in conducting contact with said pipe system serving as heat emitting surfaces. According to Figures 1, 2 and 7 there is a plate 2 only on the front of the element, whereas according to Figure 8 a plate composed of strips also is arranged on the back. The pipe coil 1 is provided with nipples 3 and 4 and may contain more or fewer pipes per unit of front surface having more or fewer abrupt end bends.

The plates are provided with plaits of greater or less depth than shown and with an outer portion 5, an inner portion 6 and two side portions 7.

For the connection between the pipe coil 1 and the plates 2 and 8 special connection elements or blocks 10 preferably made of light metal are used. These blocks preferably consist of pieces cut from a metal extrusion with the profile shown in Figure 6. The blocks each have a flange 11 having three ribs 12 extending from one side and two fingers 13 extending from the other side thereof, the fingers enclosing a recess radiused at 14 to accommodate the pipe 1.

Figure 3:
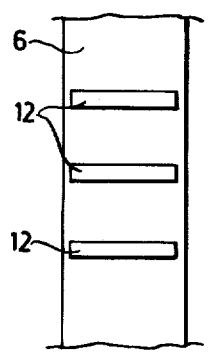
Figures 3, 4 and 5 show on larger scale a connection between the pipe system and the plate, where
Figure 4:
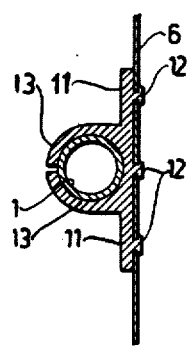

The inner plate portion 6 has three transverse slots (see Figure 4) into which the ribs 12 fit. When mounting the block, the block is put against a plate portion 6 so that the ribs 12 fit into said slots and project somewhat beyond the plate surface. The block 10 is then riveted to the portion 6 by flattening the ends of the ribs, as indicated in Figures 3 and 4. The positions of the slots are adjusted to the pipe coil.

Figure 5:
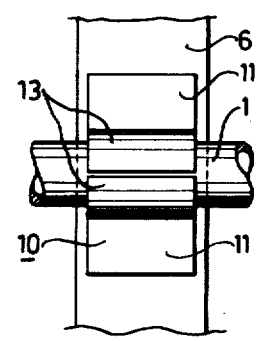

All the blocks are suitably first riveted to the portions 6 of the plate 2, which may be done in one or few machine operations in the known way. The coil 1 is then placed in the recesses 14 of the blocks 10. The fingers 13 are bent with great pressure over the pipe and into contact therewith, as shown in Figures 4 and 5. As mentioned previously, the material of the blocks should be of the kind that is work hardened by the deformation. Due to this hardening a durable, secure and intimate mechanical connection is obtained between the block and the plate on one hand and between the block and the pipe on the other hand, thus providing a good heat conducting connection between the pipe and the plate.

A plate for a heating element according to the invention may be painted in the same way as a conventional hot water or steam radiator. When made of aluminium, however, the plate need not be painted to withstand corrosion, as is the case with iron plates. The side of a plate facing an external wall is preferably left with the metallic aluminium surface untreated. In a normal room atmosphere this surface does not change and has a very low radiation coefficient. Threreby the heat radiation from the element to the external wall is only slight and so is the loss of heat through that part of the external wall. Due to the practically non-existent heat radiation from the back of the plate, the plate takes on a higher temperature than would otherwise be the case, which contributes to increasing the convection coefficient.

The manufacture of a heating element having a single-piece plate on the front as well as on the back offers certain difficulties when securing the second plate. By dividing the plates into vertical strips the manufacture is facilitated and still other advantages are obtained. In Figure 8, showing a detail of such a heating element, the plates are divided into strips 15, in which the outer portions 5, the side portions 7 and the inner portions 6 are to be found. The side edges 16 are bent at approximately right angles according to the drawing. The outermost side edges 17 of the outermost strips 15 are bent more than at right angles so as to allow a simple joint together with the correspondingly bent side edges of a couple of end strips 18 and 18'.

By the manufacture of a heating element according to Figure 8, the blocks 10 may first be riveted to the plate strips 15. The fixing of the first plate strip offers no difficulties with regard to the joining of the blocks to the pipes. The next strip to be secured should be that on the opposite side of the pipe 1, having its given place next to the first strip at the right or left side. With special tools it is possible to reach, in the space between the portion 5 of the first strip and the pipe, the fingers 13 of the blocks 10 on the second strip in order to press them together. Thus the securing of the strips is continued alternately, first on one side and then on the other side of the pipe, until the full number of strips 15 is reached.

The pipe system constitutes a rigid platform and therefore it is not necessary to fix adjacent strips to each other by special means. The edges 16 provide an adequate bearing surface between adjacent strips and create a vertical distinguishing line at the outside of the plate which makes any irregularities in the strip in the direction outwards-inwards hardly visible.

The object of the end strips 18 and 18' is to form terminations. By means of the side edges 17 they may be connected to the outermost strips 15 by means of locking slides 19. Mutually the strips 18 and 18' may be connected by means of outwardly bent side edges 17 and 17' and a locking slide 19 holding them together. The heating element according to Figure 8 is so oriented that the front plate 2 is uppermost in the drawing. The pipe 1 with the nipple 3 is bent towards the wall side and extends through a slot in the end strip 18'. For holding the end strip 18', narrower blocks 10' as shown in Figure 8 may be secured to the end strip 18' in the same way as the blocks 10. Such a joint gives sufficient stability in most cases.

The attachment of the end strip 18 may be reinforced by other blocks 20, which are clamped around the pipe bends 21 by fingers 23 and riveted to the plate by one or more ribs 22 per block. The contact of the fingers 23 with the pipe in the bends 21 has a greater or smaller surface in accordance with the radius of curvature of the pipe.

Figure 2:
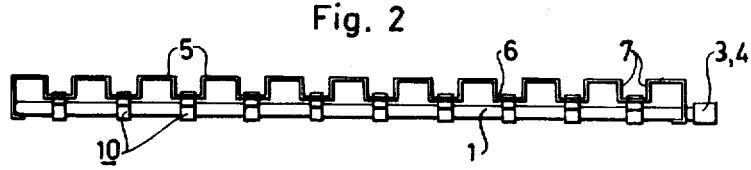
Figure 2 shows a horizontal view of the heating element according to Figure 1.

A heating element according to Figures 1, 2 and 7 may be made of strips as described above.

In another embodiment of the invention shown in Figure 8, the plate strips on one side are displaced relatively to those on the other side a distance corresponding to half the width of a plate strip. The connection with the pipe coil 1 may be carried out in the manner previously described.

Heating elements according to the invention may with a given front surface be made in a simple way for larger or smaller heating effect and with larger or smaller heating surface. The heating effect may be varied by changing the distance between the pipes in the pipe coil. The heating surface may for example be altered in such a way that the front plate of a heating element constitutes a base and the back plate constitutes an additional surface, the latter surface being made in different sizes depending on the additional effect required.

Heating elements according to the invention may be used for heating media with a high pressure, like steam and hot water. These media usually have a temperature exceeding 100° C., which is unsuitably high for heating rooms and the like. This problem is overcome by heating elements according to the invention, in which heating resistances can be easily inserted so that the surfaces emitting heat to the air do not attain an excessively high temperature. For this purpose a thin insulating foil may, by way of example, be placed between the pipes and the blocks, or the fingers be made so that they touch the pipe only in a few places and thus provide an insulating air layer in the interspaces. Insulating material may also be placed between the blocks and the plates.

If it is desired to reduce the surface temperature of the pipe coil on the exposed area thereof between the blocks, this area can be surrounded with heat insulation.

In the embodiments according to the drawings the plaits are shown rectangular which is not essential for the invention. The plaits can be made with plane or round surfaces divided by a uniform or an irregular plait with larger or smaller plane surfaces alternating with plaited ones. One of the plates of heating elements having two plates may be made plane. The other plate must have vertical channels for the flow of air.

The heating elements may also be used for cooling purposes, if the heating medium is replaced by a cooling medium.

In connection with the attachment of the blocks to the plates by squeezing said blocks tightly on the pipes, heat conductive cement may be placed on the contact surfaces. If the contact surfaces are smooth and clean the direct metal to metal contact is usually sufficient for conduction of the heat emitted by the plates to the air without any greater drop in temperature occurring at the contact areas. Instead of a heat conductive cement, a metal alloy can be used for said purpose.

A heating element according to the invention permits, for example, insertion of control and air valves, shunt conduits within the element, whereas in conventional radiators such control units have to be placed outside the radiator. In the heating element according to the invention said control units may be connected to the element during the manufacture of same, the valve housings and the coupling members being suitably hidden by the plates.

What I claim is:

A radiating element for heating and cooling purposes comprising a substantially plane pipe system of heat conductive material for the circulation of a heating medium, at least one plate of heat conductive material adjoining at least one side of the pipe system and corrugated to stiffen the plate and to form vertical air flow channels, said plate having vertical flat portions connected to the pipe system by heat conductive connections, said connections consisting of generally evenly spaced connecting elements of heat conductive material, each connecting element having a relatively thin base, integrally formed fingers projecting from one side of the base to engage a portion of the pipe system, flange portions projecting beyond each end of the base, a plurality of integrally formed rib portions, shorter in length than the fingers, projecting from the opposite side of the base and the flanges to engage corresponding openings in the flat portions of the plate and extending therebeyond, the terminal ends of the fingers being bent to conform to the pipe surface and the rib portions being deformed to engage the exterior surface of the flat portions of the plate, the length of the fingers and one side of the base providing substantially the same length as the opposite side of the base and the flanges whereby rigid heat conducting connections are made which provide substantially the same amount of contact surface for the pipe as for the plate.

References Cited in the file of this patent

UNITED STATES PATENTS

| 1,154,668 | Spalding | Sept. 28, 1915 |
| 1,805,570 | Davis | May 19, 1931 |
| 1,841,380 | Phelps et al. | Jan. 19, 1932 |
| 1,861,449 | Murray | June 7, 1932 |
| 1,936,889 | Torbensen | Nov. 28, 1933 |
| 2,053,127 | Biggs | Sept. 1, 1936 |
| 2,171,790 | Higham et al. | Sept. 5, 1939 |
| 2,320,502 | Schullstrom | June 1, 1943 |
| 2,469,451 | Burrus | May 10, 1949 |
| 2,628,078 | Krauss | Feb. 10, 1953 |
| 2,672,107 | Widman | Mar. 16, 1954 |

FOREIGN PATENTS

| 241,602 | Switzerland | Mar. 31, 1946 |